United States Patent [19]

Gasparro

[11] Patent Number: 4,818,476

[45] Date of Patent: Apr. 4, 1989

[54] REACTOR VESSEL STUD THREAD PROTECTOR

[75] Inventor: Michael R. Gasparro, Penn Hills, Pa.

[73] Assignee: Westinghouse Electric Corp., Pittsburgh, Pa.

[21] Appl. No.: 160,452

[22] Filed: Feb. 25, 1988

[51] Int. Cl.$^4$ .............................................. G21C 13/02
[52] U.S. Cl. .................................. 376/294; 376/205; 376/463
[58] Field of Search ............... 376/205, 262, 277, 294, 376/463

[56] References Cited

U.S. PATENT DOCUMENTS

| | | | |
|---|---|---|---|
| 2,715,152 | 8/1955 | Balzer | 220/327 |
| 2,827,507 | 3/1958 | Anderson | 220/327 |
| 3,007,214 | 11/1961 | Focht et al. | 220/327 |
| 3,135,558 | 6/1964 | Johnston, Jr. et al. | 301/37 |
| 3,241,427 | 3/1966 | Bosler . | |
| 3,323,541 | 6/1967 | Schneider, Jr. et al. | 220/327 |
| 3,425,313 | 2/1969 | Villo . | |
| 3,548,704 | 12/1970 | Kutryk . | |
| 3,753,853 | 8/1973 | Schabert | 376/287 |
| 3,775,251 | 11/1973 | Schabert | 376/287 |
| 3,926,722 | 12/1975 | Dupen | 376/205 |
| 4,405,055 | 9/1983 | Koerdt et al. | 376/287 |
| 4,621,230 | 11/1986 | Crouch et al. | 324/110 |
| 4,695,099 | 9/1987 | Klein | 301/37 |

FOREIGN PATENT DOCUMENTS 240505  6/1960  Australia .............................. 220/327

Primary Examiner—Deborah L. Kyle
Assistant Examiner—Richard W. Wendtland
Attorney, Agent, or Firm—Michael G. Panian

[57] ABSTRACT

The reactor vessel thread protector is a metal cover that is placed over the exposed stud, nut and washer projecting above the closure head to protect the threads from accidental corrosive leakage impingement emitted from mechanical seals on the top of the reactor vessel head. The stud protector includes a drip pan to collect any such fluid being emitted from the reactor vessel. Additionally, the reactor vessel stud thread protector will provide protection from accidental deformation to a stud due to operator maintenance around adjacent studs. The reactor vessel stud thread protector can be in the form of a cylinder which would cover a single stud bolt or a curved box having a rectangular cross-section that would cover a plurality of stud bolts.

15 Claims, 3 Drawing Sheets

REACTOR VESSEL STUD THREAD PROTECTOR

TECHNICAL FIELD

The invention relates to a nuclear pressure vessel closure head, and more particularly to a nuclear reactor vessel stud thread protector to protect the exposed threaded section of a stud bolt and an associated nut projecting above the vessel head.

BACKGROUND OF THE INVENTION

In a typical nuclear reactor pressure vessel, a removable closure head is secured to the pressure vessel by a multitude of stud bolts, each having an associated nut and washer. One design of a typical four-loop plant has 54 such stud bolts. Stud bolts typically have threaded sections at both ends: the lower threaded section passes through an aperture in the vessel head and is received within a threaded bore in the reactor vessel flange; and the upper threaded section projects above the vessel head, upon which section the nut is torqued down against an associated washer and the vessel head to compress a seal between the head and the vessel. In this manner, the vessel head is securely held in sealing engagement with the reactor vessel.

For uniform nut loading on the studs, the studs are tensioned by a process well known in the art. The studs are tensioned and the nuts securely threaded thereon and torqued at a predetermined level, which procedure prevents inadvertent loosening of the nuts during reactor operation. A measuring rod is received within a vertical bore which extends the entire length of the stud, and is used to measure stud elongation to ensure proper tensioning. After the head has been so installed the vertical bore is sealed by means of a screw or bolt which is threaded into the top portion of the stud in order to prevent accumulation of water or other material therein.

Projecting through the top of the vessel head are a plurality of control rod drive mechanism housings. For a typical four loop plant, there are about 80 such ports. An example of one such design is shown in FIGS. 1A and 1B. Normally, there are on the order of 60 fuel assemblies out of the approximately 200 within the reactor vessel core which have control rods associated therewith. Depending upon such factors as power level of the reactor, enrichment and depletion of fuel in the core, control rod drive mechanisms are inserted through preselected housings. The remaining housings are utilized as instrumentation ports or spare penetrations. The instrumentation ports are for the introduction of instrumentation devices, such as thermocouples, into the reactor vessel.

The control rod drive mechanism housing is a stainless steel pressure housing attached to a head adapter or port projecting upward from the reactor vessel head. The adapter is welded to the reactor vessel head and constitutes, in effect, an integral part of the vessel. A typical pressurized water reactor is operated at an internal pressure of about 15 MPa (2250 psia); the design pressure of the reactor vessel and associated components is about 17 MPa (2500 psia). Control rods secured to the lower end of the control rod drive mechanism are periodically inserted into and withdrawn from a fuel assembly, depending on power demands in the reactor core. Reactor coolant water may leak from the mechanical flange joint on the housing because of such large internal pressures. When the drive mechanism is withdrawn, a thin film of liquid coolant around the drive mechanism may be withdrawn with it. This coolant may then drip onto reactor vessel components, specifically the exposed portion of the stud bolt projecting above the vessel head. Therefore, although the vessel and associated components are welded and sealed as best as they can be, it may be possible for some liquid coolant, typically water, to drip from the control rod drive mechanism housings.

The coolant within the reactor vessel is slightly acidic due to the presence of boric acid which is dissolved within the coolant. Boric acid is a neutron absorber used as a variable reactivity control over the long term operation of the plant, whereas the control rods provide rapid reactivity control for shutdown and other rapid reactivity changes. The number and placement of control rods is dependent upon numerous operating characteristics of a nuclear power plant.

Even though there are regulatory limits on the allowable amount of coolant which be emitted from the reactor vessel, components on the exterior and in close proximity to the reactor vessel need to be protected from any possible corrosive leakage impingement due to the presence of borated water. One purpose of the top closure screw, referred to previously, disposed within the bore of the stud is to prevent accumulation of this potentially corrosive borated water within the stud. Although the internal vertical bore of the stud bolt is sealed off from this corrosive spray leakage, the exposed external threads of the stud projecting above the vessel head, as well as the associated nut and washer, are not.

If the exposed threads are damaged, it may become difficult to quickly and easily remove the nuts therefrom. This is undesirable since removal and replacement of the vessel head is to be completed in as short a time period as possible. First, since the reactor vessel in a containment building of a nuclear power plant defines an irradiated environment, it is advantageous to provide for rapid maintenance procedures to reduce the time in which maintenance personnel are required to spend in and around such environment, thereby reducing individual man-rem exposure. Secondly, the quicker and easier such routine maintenance can be performed, the less down time experienced by the nuclear reactor. Since a nuclear reactor power plant operator cannot generate electricity when the plant is not operating, it must purchase replacement power elsewhere. Plus the more rapidly routine maintenance can be completed, that much more time can be devoted to actual power plant operation thereby improving the efficiency of the plant as well as increasing revenues generated by its operator.

There exists in the prior art conventional protective caps for bolts and nuts. An example of which is U.S. Pat. No. 3,548,704 issued to Kutryk on Dec. 22, 1970. Although such devices are satisfactory for use in a normal, everyday environment, a nuclear power plant presents additional concerns and considerations. Such a plant is a highly sophisticated and complex machine, damage to which must be prevented with great diligence. Also, any coolant that may be emitted from the reactor vessel needs to be safely dealt with and controlled, and not allowed to merely run off the protector to the environment. Thus a stud protector for use in association with a nuclear power plant must not only be a reliable device which cannot be accidentally removed, but must also be able to control the leak path o the coolant. It must be able to withstand the relatively harsh environment, especially with respect to the borated coolant. Furthermore, it is highly desirable to have available a stud thread and nut protector which can add significantly to other safety aspects associated with a nuclear power plant.

It is therefore an object of the present invention to provide a reactor vessel stud thread and nut protector which can be used in the highly specialized environment of a nuclear reactor pressure vessel.

It is another object of the present invention to provide such a device which will prevent damage to exposed threads and nuts resulting from potentially corrosive spray leakage of borated and irradiated coolant.

It is a further object of the present invention to provide a reactor vessel stud thread protector which can also collect any such coolant for return to the reactor's coolant system.

It is a still further object of the present invention to provide a device which will provide protection from accidental deformation to the stud, nut and washer due to operator maintenance around adjacent studs.

DISCLOSURE OF THE INVENTION

In combination with a nuclear reactor pressure vessel having a removable closure head, the closure head being sealingly engaged with the pressure vessel by a plurality of stud bolts, said bolts each having a lower end threadingly engaged within a flange section of the vessel and an upper end passing through a corresponding aperture in the closure head and projecting thereabove, the upper end also having a threaded section for threadingly engaging a nut and thereby sealingly engaging the closure head with the pressure vessel. A vertical bore is disposed within the stud bolt, the bore being internally threaded at its upper end. The combination further includes a reactor vessel stud thread protector which encloses the exposed portion of the bolt and nut projecting above the vessel head, wherein the protector is comprised of a tubular wall portion being open at its lower end and substantially closed at its upper end. The upper end has a hole therethrough adapted to receive a closure screw, the screw having a head of a diameter larger than the hole and a threaded portion on its lower end adapted to be received in the internally threaded portion of the upper end of the stud bolt. A drip pan associated with the outer surface of the protector is disposed radially inwardly with respect to the outer periphery of the vessel head, whereby the drip pan collects any fluid being emitted from the reactor vessel.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

Figure 1:
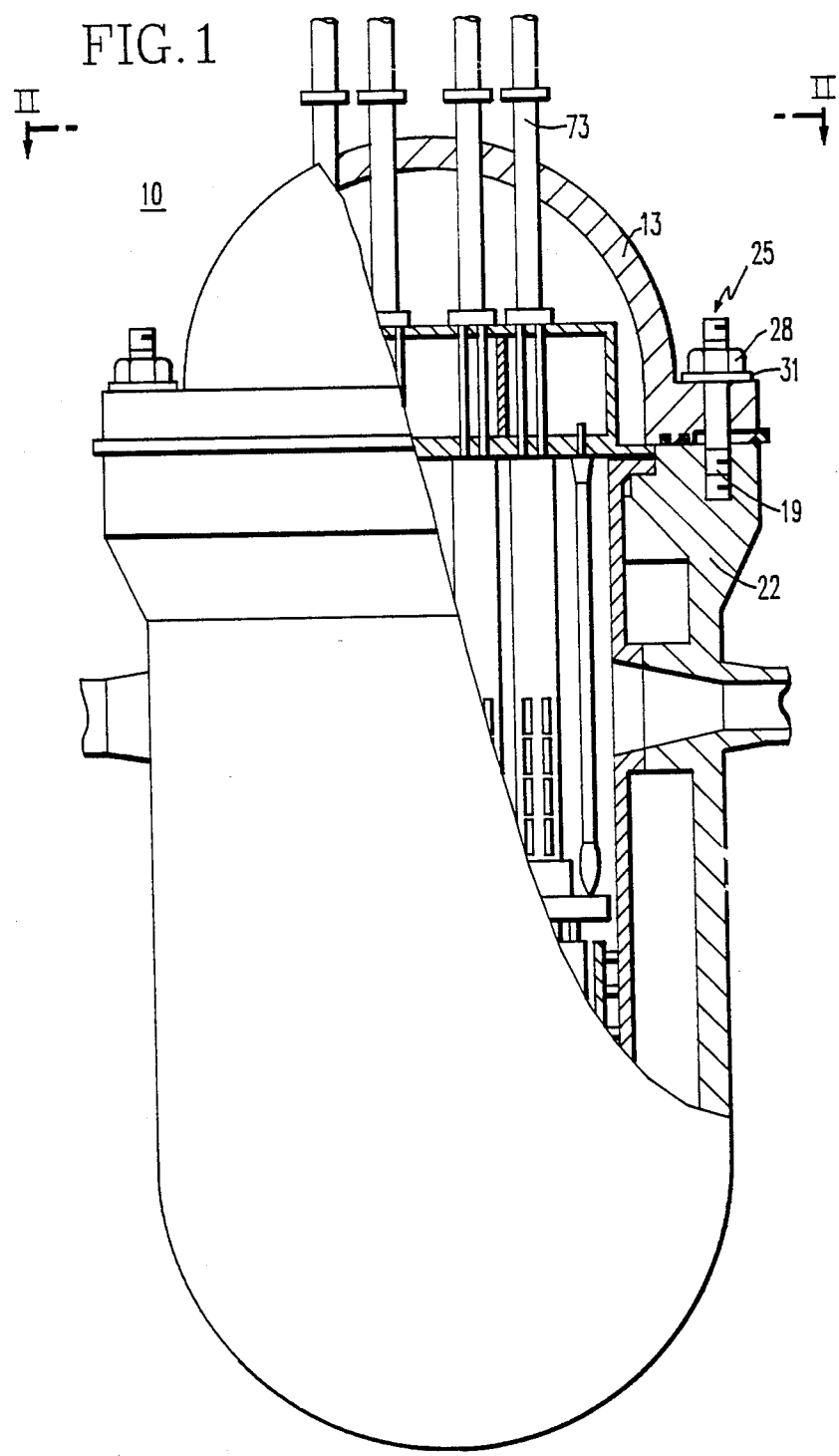
FIG. 1 is an elevational view, partially in section, of one design of a typical nuclear reactor pressure vessel showing the reactor internals as well as several control rod drive mechanisms and instrumentation port housings projecting through the reactor vessel closure head.
Figure 2:
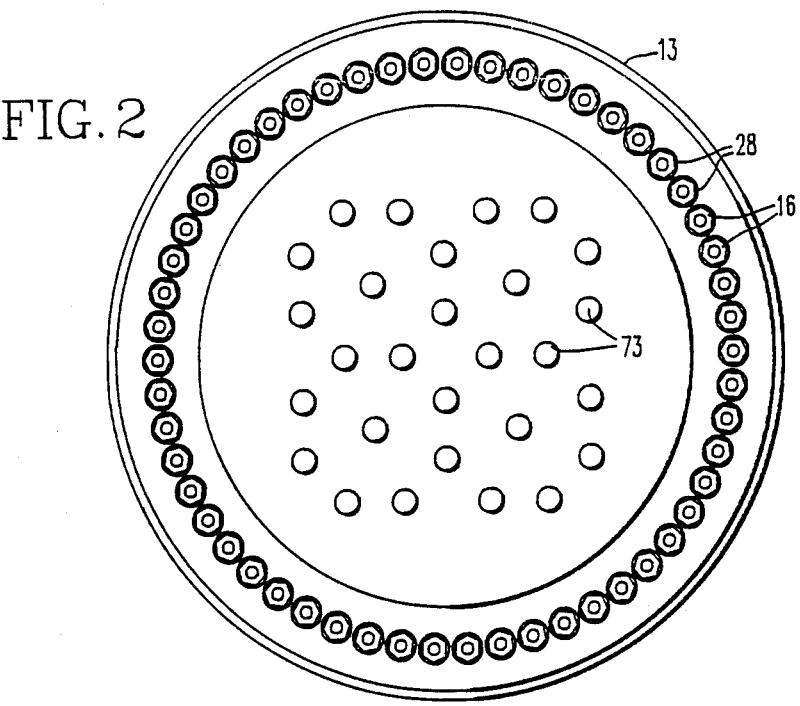
FIG. 2 is a top plan view of the reactor vessel taken along the lines II—II of FIG. 1A.
Figure 3:
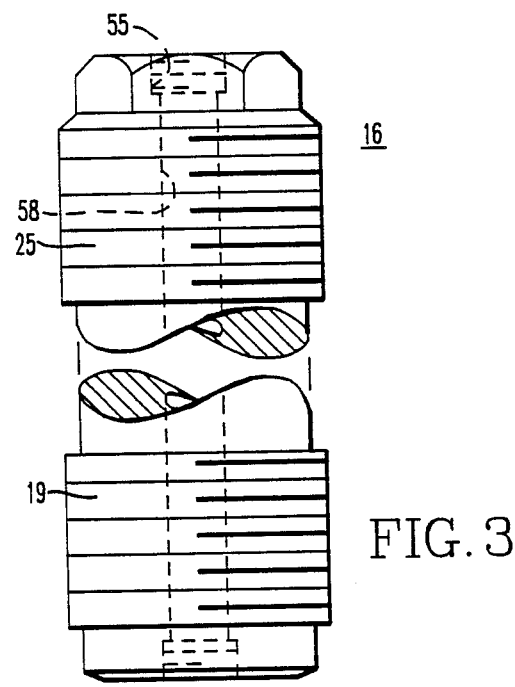
FIG. 3 is an enlarged view of one design of a typical stud bolt.

Referring now to the drawings in detail, FIGS. 1 and 2 show one design of a typical nuclear reactor pressure vessel 10 having a removable closure head 13, the closure head 13 being sealingly engaged with the pressure vessel 10 by means of a plurality of stud bolts 16 (see FIG. 3). Each bolt 16 has a lower end 19 which is threadingly received in a portion of the reactor vessel flange 22. An upper end 25 of the bolt 16, which also has a threaded section, passes through a corresponding aperture in the vessel head 13 and projects thereabove. The upper end 25 is threadingly engaged with a nut 28 and washer 31 to compress vessel head closure seals 34 disposed between the vessel head 13 and the flange 22 to thereby sealingly engage the closure head 13 with the pressure vessel 10. In this configuration, the upper most end of the top threaded section 25 remains exposed to the environment. To prevent damage to the top threaded section 25 or the nut 28, which would prevent the nut 28 from being easily removed from the stud bolt 16, a reactor vessel stud thread protector 40 (see FIG. 4) of the present invention is utilized.

The stud thread protector or cap 40 is comprised of a tubular or generally cylindrical wall portion 43 disposed over a single stud bolt which is opened at its lower end 46 and substantially closed at its upper end 49, the upper end 49 having a hole therethrough to allow passage of a closure or hold down screw 52 which is threadingly engaged with an internally threaded section 55 of vertical bore 58 within the stud bolt 16. On the lower end 46 of the wall portion 43 is a seal 61 to prevent coolant, typically water, from passing under the protector 40 into contact with the stud 16, nut 28, or washer 31. Preferably, this seal 61 is constructed of nuclear grade neoprene and is in the form of a replaceable O-ring or gasket. To prevent damage to the stud bolt 16, the hold down screw 52, which may also have a seal associated therewith, is sufficiently torqued within the reactor vessel stud bolt 16 to sufficiently compress the seal 61.

Figure 4:
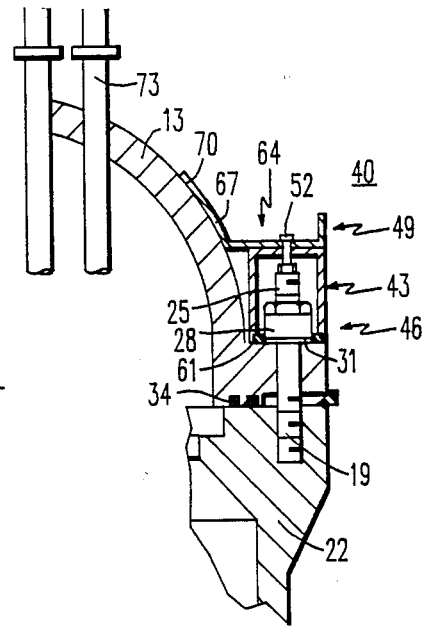
FIG. 4 is an enlarged sectional view of the reactor vessel head showing a first embodiment of the present invention of a reactor vessel stud thread protector.

In the embodiment shown in FIG. 4, the reactor vessel stud thread protector 40 further includes a drip pan 64 associated therewith; the drip pan 64 being radially inwardly disposed with respect to the outer periphery of the vessel head 13 whereby the drip pan 64 collects any fluid which may be emitted from the reactor vessel 10. This drip pan 64, at one end 67 thereof, is form fitting with the top surface 70 of the vessel head 13 to further prevent any damage by borated fluid to the stud bolts 16. If necessary, coolant may be removed from around the bolts 16 by a typical water vacuum system prior to removal of the reactor vessel head 13. With the inclusion of the drip pan 64 any possible accidental corrosive leakage from mechanical seals of the control rod drive mechanism housings or instrumentation ports 73 on top of the reactor vessel 16 can be controlled. The drip pan 64 can be an integral part of the protector 40, or a separate member which is placed upon the protector prior to the hold down screw 52 being threadedly engaged therein.

A further advantage of the reactor vessel stud thread protector 40, in addition to protecting the threaded section 25 of the stud bolt 16 from accidental corrosive leakage impingement, is that the reactor vessel stud thread protector provides protection from inadvertent deformation due to operator maintenance around adjacent studs. Preferably the stud thread protector 40 is made of a strong material, such as stainless steel, the walls 43 being from 1/16 to ⅛ inch thick. By providing a seal 61, a close fit between the protector 40 and the elements of the stud 16 and nut 28 is not required. Thus, no problem arises with the protector 40 becoming stuck on the stud bolt 16 and thereby causing delay in removal of the head of refueling operations.

Figure 5:
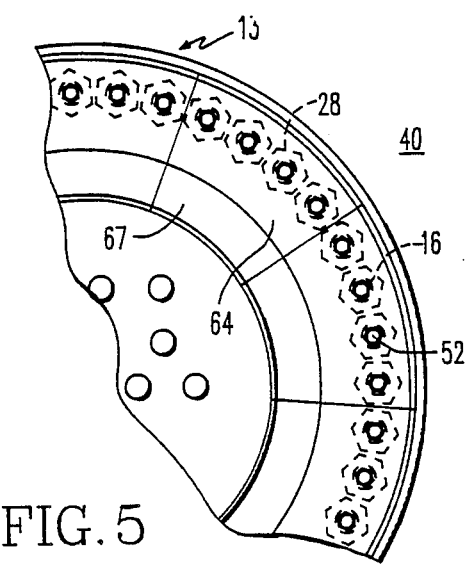
FIG. 5 is a top plan view of a second embodiment of the present invention.

In a second embodiment shown in FIG. 5, the reactor vessel stud protector 40 is designed to cover several studs with one device in the shape of a curved box having a generally rectangular cross-section. For example, five such studs 16 could be covered by one protector 40. In this manner, it is necessary only to engage a holddown screw 52 with alternating stud bolts 16 (see FIG. 5). Since there is essentially no vibration of the reactor vessel 10, the minimal force required to seal the protector 40 against the vessel head 13 with hold down screws 52, i.e., to compress the seal 61 which in this embodiment is oval-shaped in conformity with the multiple stud protector, is therefore readily provided for by such a configuration. In this design drip pans 64 of adjacent protectors 40 have overlapping sections such that, as a whole, said drip pans 64 combine to form a continuous channel around the circumference of the vessel head 13. Alternatively, if the drip pan 64 is a separate member apart from the protector 40, it can be constructed of a continuous, one-piece ring-like element which is positioned over the stud protector 40 and the vessel head 13. This configuration lends itself to even greater speed in removing the reactor vessel head 13, in that a substantially less number of hold down screws 52 need be removed from the stud bolts 16, prior to removal of the nuts 28 and washers 31 to remove the vessel head 13. Once the hold down or closure screws 52 have been removed from every other stud 16, the stud thread protectors 40 can easily be removed by engaging a lifting eye (not shown) on the protector 40 to lift it out of engagement with the vessel head 13. Since the risk of damage to the exposed upper threaded section 25 of the stud bolt 16 by either the inadvertent corrosive leakage impingement or accidental deformation is virtually eliminated, removal of the nuts 28 is greatly facilitated. Hence, the vast number of stud bolts 16 can be more quickly and easily removed thereby reducing man-rem exposure to maintenance personnel within a potentially hazardous environment, as well the amount of time necessary for refueling operations.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting to the scope of the invention which is to be given the full breadth of the appended claims and in any and all equivalents thereof.

I claim:

1. In combination with a nuclear reactor pressure vessel having a removable closure head, the closure head being sealingly engaged with the pressure vessel by a plurality of stud bolts, an upper end thereof having a threaded section for threadingly engaging a nut and a vertical bore being disposed within the stud bolt, the combination further including a reactor vessel stud thread protector which encloses the exposed upper portion of the bolt and associated nut projecting above the closure head, wherein the reactor vessel stud thread protector is comprised of: a tubular wall portion being opened at its lower end and substantially closed at its upper end; a drip pan associated with the outer surface of the protector, said drip pan being disposed radially inwardly with respect to the outer periphery of the vessel head, whereby the drip pan collects any fluid being emitted from the reactor vessel; and means for fastening the stud thread protector to an associated stud.

2. The combination as recited in claim 1, wherein the fastener means consists of a closure screw which passes through a hole in the upper end and is threadingly received within an internally threaded upper portion of the vertical bore.

3. The combination as recited in claim 1 wherein said protector is configured of a generally cylindrical wall portion disposed over a single stud bolt.

4. The combination as recited in claim 1, wherein said protector is configured of a curved box having a generally rectangular cross-section disposed over a plurality of said bolts.

5. The combination as recited in claim 2, wherein the protector is disposed over at least four of said stud bolts, a plurality of said closure screws being disposed at least within bores of alternating stud bolts.

6. The combination as recited in claim 1, wherein the lower end of the reactor vessel stud thread protector is adapted to be sealingly engaged against an upper surface of the closure head.

7. The combination as recited in claim 1, wherein the stud thread protector is made of stainless steel.

8. The combination as recited in claim 7, wherein the wall portion of the stud thread protector is between about 1/16 to ⅛ of an inch in thickness.

9. In combination with a nuclear reactor pressure vessel having a vessel head sealingly engaged with a flange portion of the vessel by a plurality of stud bolts each having an associated nut and washer, said stud bolts having a vertical bore therein, the pressure vessel further including a plurality of control rod drive mechanism housings projecting upward through the vessel head into which control rod drive mechanism are periodically inserted and withdrawn thereby causing a film of liquid coolant to be withdrawn therewith, whereby said liquid may drip from said control rod drive mechanism onto the pressure vessel, a reactor vessel stud thread protector comprising:

a cap portion having a hole in its upper end for covering one or more stud bolts;

a pan portion extending radially inwardly from the cap portion and having a wall portion which registers with the vessel head to form a drip pan for collecting said drips from said control rod drive mechanisms; and one or more closure screws for fastening the stud thread protector to one or more of said stud bolts, said closure screw passing through the hole in the cap portion and being threadingly received within an internally threaded upper portion of the vertical bore.

10. The combination as recited in claim 9, wherein the cap portion is configured of a generally cylindrical wall disposed over a single stud bolt.

11. The combination as recited in claim 9, wherein said protector is configured of a curved box having rectangular cross-section disposed over a plurality of said bolts.

12. The combination as recited in claim 11, wherein the protector is disposed over at least five of said stud bolts.

13. The combination as recited in claim 9, wherein the lower end of the reactor vessel stud thread protector is adapted to be sealingly engaged against an upper surface of the closure head.

14. The combination as recited in claim 9, wherein the stud thread protector is made of stainless steel.

15. The combination as recited in claim 14, wherein the wall portion of the stud thread protector is between about 1/16 to ⅛ of an inch in thickness.

* * * * *